United States Patent
Cleanthous et al.

(10) Patent No.: US 10,668,642 B2
(45) Date of Patent: Jun. 2, 2020

(54) MITER SAW WITH IMPROVED CARRYING MODE

(71) Applicant: BLACK & DECKER INC., NewBritian, CT (US)

(72) Inventors: Aris C. Cleanthous, Baltimore, MD (US); Christian V. Elder, Baltimore, MD (US); Christopher T. King, Castonsville, MD (US)

(73) Assignee: BLACK & DECKER INC., New Britain, CT (US)

( * ) Notice: Subject to any disclaimer, the term of this patent is extended or adjusted under 35 U.S.C. 154(b) by 0 days.

(21) Appl. No.: 15/937,963

(22) Filed: Mar. 28, 2018

(65) Prior Publication Data
US 2019/0099912 A1    Apr. 4, 2019

Related U.S. Application Data

(63) Continuation of application No. 14/833,234, filed on Aug. 24, 2015, now Pat. No. 9,962,852.

(60) Provisional application No. 62/043,489, filed on Aug. 29, 2014.

(51) Int. Cl.
| | |
|---|---|
| *B27B 5/29* | (2006.01) |
| *B23D 45/02* | (2006.01) |
| *B23D 45/04* | (2006.01) |
| *B23D 47/02* | (2006.01) |

(52) U.S. Cl.
CPC ............. *B27B 5/29* (2013.01); *B23D 45/024* (2013.01); *B23D 45/048* (2013.01); *B23D 47/025* (2013.01)

(58) Field of Classification Search
CPC .. B23D 45/048; B23D 47/025; B23D 56/003; B23D 45/024; B27B 5/29; Y10T 83/8773; Y10T 83/855; Y10T 83/7684; Y10T 83/7726; B27D 47/02
USPC ... 83/471, 477.1, 471.3, 471.2, 522.16, 581, 83/490, 522, 468.2, 468.6, 473, 522.18, 83/468.3, 468, 468.5
See application file for complete search history.

(56) References Cited

U.S. PATENT DOCUMENTS

| | | | |
|---|---|---|---|
| 2002/0127960 A1* | 9/2002 | Brazell | B23D 45/042 451/280 |
| 2002/0148336 A1 | 10/2002 | Chen | |
| 2005/0247177 A1 | 11/2005 | Hetcher et al. | |

(Continued)

OTHER PUBLICATIONS

Dewalt DWS780 miter saw.

(Continued)

*Primary Examiner* — Ghassem Alie
(74) *Attorney, Agent, or Firm* — Adan Ayala

(57) ABSTRACT

A miter saw has a base assembly and a rotatable table disposed on the base assembly. The rotatable table is rotatable about a substantially vertical miter axis and has a substantially horizontal workpiece-supporting plane. A saw assembly is connected to the table and includes a blade. The blade is movable downwardly from a first position where the blade is above the workpiece-supporting plane to a second position where a portion of the blade is below the workpiece-supporting plane. The base assembly has a top surface and a first handle disposed on the top surface, with a first hole on the top surface extending through the base assembly, the first hole being configured to allow a user to extend the user's hand therethrough and grip the first handle.

13 Claims, 2 Drawing Sheets

(56) References Cited

U.S. PATENT DOCUMENTS

| | | |
|---|---|---|
| 2009/0301277 A1 | 12/2009 | Ipatenco et al. |
| 2010/0043614 A1 | 2/2010 | Gehret et al. |
| 2011/0247471 A1* | 10/2011 | Koegel ................ B23D 47/00 83/471.3 |
| 2012/0192693 A1* | 8/2012 | Brown .................. B23D 49/08 83/746 |
| 2015/0246399 A1 | 9/2015 | Knight et al. |
| 2016/0243631 A1 | 8/2016 | Brewster et al. |
| 2016/0368131 A1 | 12/2016 | Ursell et al. |

OTHER PUBLICATIONS

Rigid Professional Tools, Operator's Manual for MS1290LZA in. Sliding Compound Miter Saw with Laser, 40 pages (publicly available at least as early as Jan. 6, 2011.

\* cited by examiner

MITER SAW WITH IMPROVED CARRYING MODE

CROSS-REFERENCE TO RELATED APPLICATION

The following application derives priority from U.S. Patent Application No. 62/043,489, filed on Aug. 29, 2014, which is hereby incorporated in whole by reference.

FIELD OF THE INVENTION

The present invention relates to miter saws, and in particular, to a miter saw with an improved carrying mode.

BACKGROUND

Chop saws and miter saws are commonly found on jobsites because of their versatility and ability to make cuts that other power tools cannot make quickly. Typically a chop saw has a base assembly and a saw assembly attached to the base that can be lowered into a cutting position. One such chop saw illustrated in U.S. Pat. No. 6,272,960, which is fully incorporated herein by reference.

A miter saw is a chop saw that has a rotatable table in its base assembly for allowing miter cuts. Some miter saws, such as the one illustrated in U.S. Pat. No. 5,297,463, which is fully incorporated herein by reference, have a beveling saw assembly, which allows bevel cuts, i.e., inclined cuts relative to the workpiece-supporting plane of the base assembly and/or table. In addition, in some miter saws, the saw assembly may beveled rightwardly and leftwardly from a zero-bevel position, i.e., 90 degrees relative to the workpiece-supporting plane. One such chop saw illustrated in U.S. Pat. No. 7,252,027, which is fully incorporated herein by reference.

One problem with prior art chop saws is that they may be unwieldy to carry. Users tend to carry them by holding the saw's base assembly with both hands, or carrying them by the carrying handle 26. The present chop saw is more manageable to carry.

DESCRIPTION

Figure 1:
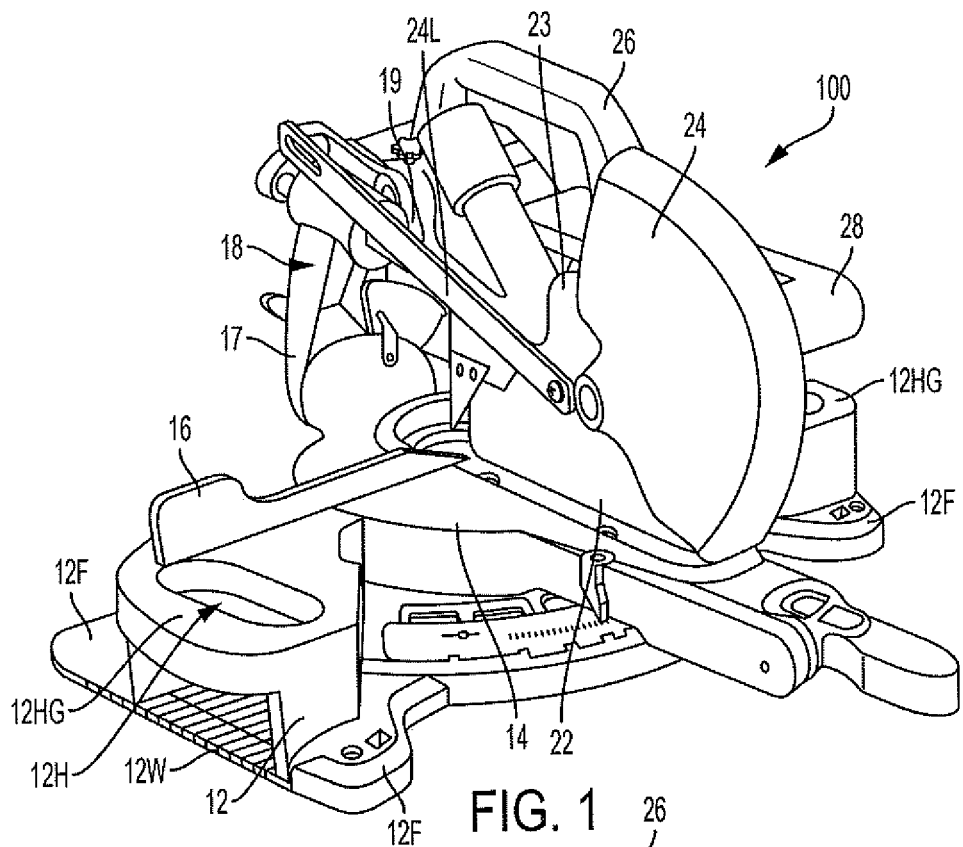
FIG. 1 is a front left perspective view of a miter saw.
Figure 2:
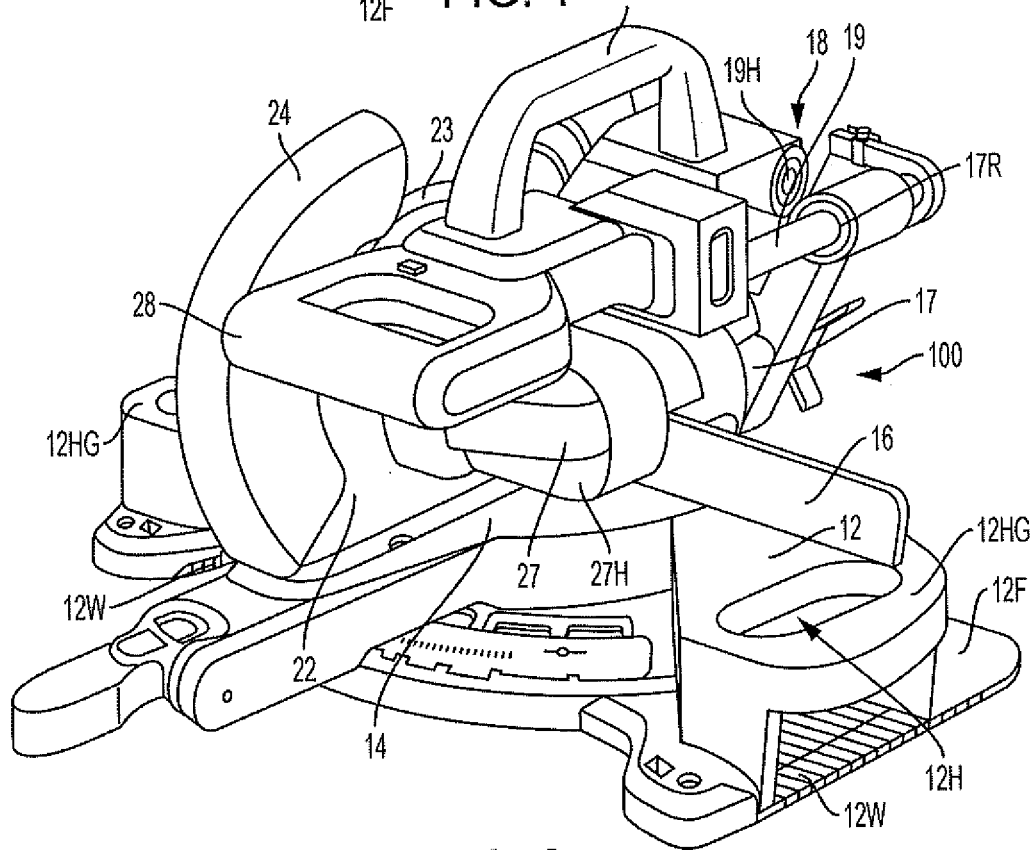
FIG. 2 is a front right perspective view of the miter saw of FIG. 1.

FIGS. 1-2 illustrates a chop saw 100 according to the invention, where like numerals refer to like parts. Chop saw 100 has a base assembly 12, which may include a rotatable table 14. A fence assembly 16 is connected to base assembly 12.

Saw assembly 18 is pivotally attached to table 14. Saw assembly 18 includes a support housing 17 which is rotatably connected to table 14. Support housing 17 preferably supports rails 17R, which preferably slide therethrough.

At the end of rails 17R, it is preferable to provide a hinge 19H. A pivot arm 19 is pivotably attached to hinge 19H. Pivot arm 19 supports a motor 27 in a housing 27H. Motor 27 is operably connected to a blade 22 for driving blade 22. A transmission (not shown) may connect motor 27 to blade 22.

An upper portion of blade 22 may be covered by an upper guard 23, which is supported by pivot arm 19. A movable lower guard 24 may be rotatably attached to upper guard 23. Lower guard 24 covers a lower portion of blade 22 until the pivot arm 19 (and thus saw assembly 18) is moved downwardly in a chopping action. A linkage 24L moves lower guard 24 to expose the lower portion of blade 22 for cutting a workpiece.

Chop saw 100 has a handle 28 for lowering pivot arm 19 (and thus saw assembly 18) in the chopping action. In addition, chop saw 100 may have a carrying handle 26.

Figure 6:
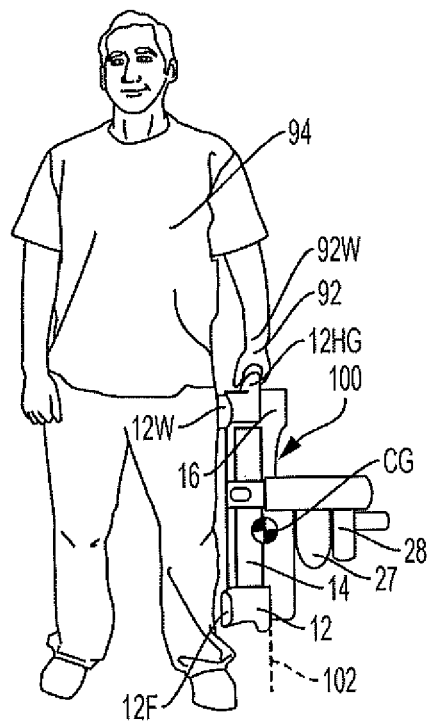
FIG. 6 illustrates a person carrying the miter saw of FIG. 1.

Base assembly 12 preferably has handles 12H configured to be gripped by a palmar surface of the hand 92 of a user 94 when the user 94 is transporting chop saw 100 (see FIG. 6). Carrying handle 12H may have a grip portion 12HG that is contoured to receive the fingers of the user 94 when the user 94 is transporting chop saw 100.

Figure 3:
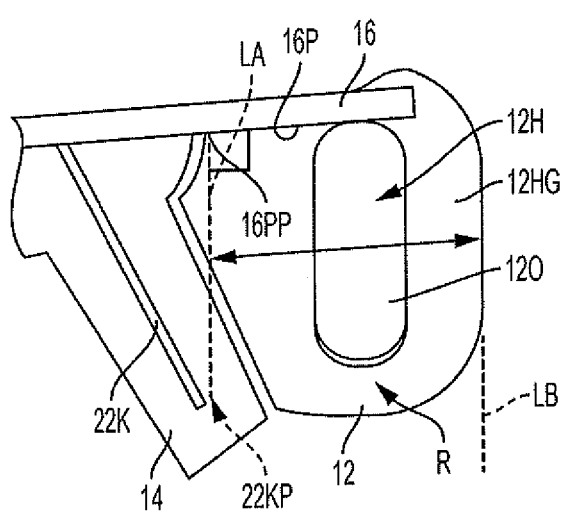
FIG. 3 is a top view of a portion of the miter saw of FIG. 1.
Figure 4:
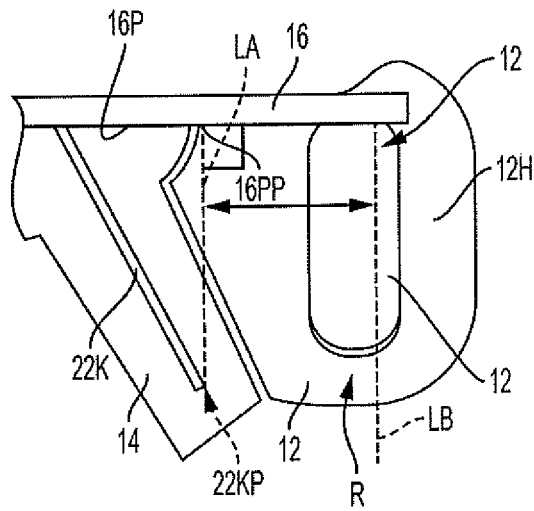
FIG. 4 is an alternative top view of a portion of the miter saw of FIG. 1.
Figure 5:
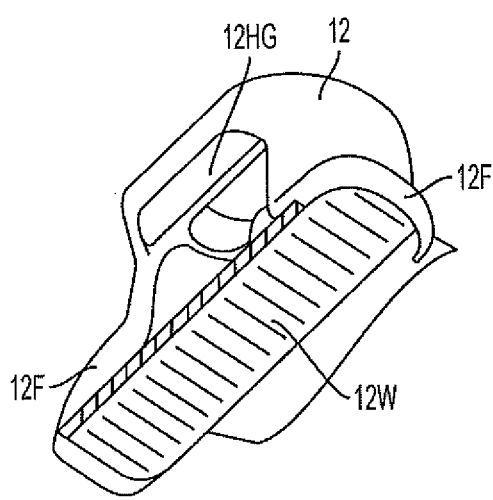
FIG. 5 is a bottom left perspective view of a portion of the miter saw of FIG. 1.

Preferably a portion of handle 12H is disposed within a region R disposed between lines LA, LB. Line LA is disposed between point 22KP, which is the point along the cutting kerf 22K (i.e., the intersection of blade 22 and the support surface of table 14, which is within plane 102) that is farthest from the fence 16 when table 14 is mitered (i.e., rotated) to its most extreme position (either leftwardly or rightwardly; FIGS. 3-4 show table 14 in the rightmost position), and a point 16PP in the plane 16P of fence 16, so that, when line LA is drawn between points 22KP, 16P, line LA is substantially perpendicular to the plane 16P. Line LB is substantially parallel to line LA and about 100 millimeters from line LA.

As shown in FIG. 3, grip portion 12HG can be disposed within region R. Alternatively, grip portion 12HG can be disposed outside of region R. Grip portion 12HG preferably has a top surface that is substantially coplanar with the plane 102 of table 14. Persons skilled in the art will recognize that providing a grip portion 12HG that is substantially coplanar with the support surface of table 14 effectively extends the workpiece support surface of base assembly 12. Due to the opening 120, which allows the user to insert his/her fingers therein, the overall weight is not substantially affected, thus providing a larger workpiece support surface with little added weight.

Grip portion 12HG is preferably formed about a center line that lies in (or is positionable into) a plane that includes the center of gravity CG of chop saw 100. It may be advantageous to design chop saw 100 to place the center of gravity CG (when chop saw 100 is held in a vertical orientation as shown in FIG. 6) within the plane 102 of the support surface of table 14.

Preferably plane 102 is proximate a lateral side of the user 94 (i.e., within about 10 inches of the lateral side, and preferably about 3 inches to about 7 inches) and the user's wrist 92W is not in a state of flexion. With the carrying handle 26 so positioned, the user 94 is able to comfortably carry the chop saw 100.

Because the base assembly 12 and table 14 are typically made of metal with ribs provided below plane 102, it is preferable to provide the bottom of base assembly with at least one bottom surface plate 12W. Plate(s) 12W could extend between the feet 12F of base assembly 12 and possibly cover the entire underside of base 12. Preferably plate(s) 12W would be made of plastic, rubber and/or an elastomeric material. Persons skilled in the art will recognize that providing plate(s) 12W will allow the user 94 to comfortably place chop saw 100 against his/her leg.

The description of the invention is merely exemplary in nature and, thus, variations that do not depart from the gist of the invention are intended to be within the scope of the invention. Such variations are not to be regarded as a departure from the scope of the invention.

What is claimed is:

1. A miter saw comprising:
a base assembly;
a rotatable table disposed on the base assembly, the rotatable table being rotatable about a substantially vertical miter axis and having a substantially horizontal workpiece-supporting plane;
a saw assembly connected to the table, the saw assembly comprising a blade, the blade being movable for a cutting operation downwardly from a first position where the blade is above the workpiece-supporting plane to a second position where a portion of the blade is below the workpiece-supporting plane; and
a fence connected to the base assembly, the fence defining a fence plane;
wherein the base assembly has a top surface and a first handle disposed on the top surface, with a first hole on the top surface extending through the base assembly, the first hole being configured to allow a user to extend the user's hand therethrough and grip the first handle, the top surface being coplanar with the workpiece-supporting plane, and
the miter saw having a center of gravity within the workpiece-supporting plane;
wherein the miter saw is carryable by the user gripping the first handle in a position where the workpiece-supporting plane is substantially vertical, the workpiece-supporting plane being within 10 inches from a lateral side of the user when the miter saw is being carried.

2. The miter saw of claim 1, wherein a portion of the first handle is disposed within a region of the base assembly.

3. The miter saw of claim 2, wherein the region is defined by a first line between a first point along a cutting kerf that is farthest from the fence when the table is mitered and a second point on the fence plane, where the first line is substantially perpendicular to the fence plane, and a second line substantially parallel to the first line.

4. The miter saw of claim 3, wherein a distance between the first and second lines is about 100 millimeters.

5. The miter saw of claim 1, wherein the first plane includes the center of gravity when the miter saw is disposed in a position where the workpiece-supporting plane is substantially vertical.

6. The miter saw of claim 1, wherein the first plane is within about 3 inches and about 7 inches from the lateral side of the user.

7. The miter saw of claim 1, wherein the miter saw is carryable in a position where the workpiece-supporting plane is substantially vertical by the user gripping the grip portion and the user's wrist is not in a state of flexion.

8. The miter saw of claim 1, wherein the base assembly further comprises a front foot and a rear foot disposed near the first handle, and a first plate extending between the front and rear feet.

9. The miter saw of claim 8, wherein the plate is made of plastic, rubber and/or an elastomeric material.

10. The miter saw of claim 1, wherein the first handle is disposed rightwardly of the blade.

11. The miter saw of claim 10, wherein the base assembly has a second handle disposed on the top surface leftwardly of the blade, with a second hole on the top surface extending through the base assembly, the second hole being configured to allow a user to extend the user's hand therethrough and grip the second handle.

12. The miter saw of claim 11, wherein a portion of the second handle is disposed within a region of the base assembly, the region being defined by a first line between a first point along a cutting kerf that is farthest from the fence when the table is mitered leftwardly and a second point on the fence plane, where the first line is substantially perpendicular to the fence plane, and a second line substantially parallel to the first line.

13. The miter saw of claim 12, wherein a distance between the first and second lines is about 100 millimeters.

* * * * *